United States Patent
Hinton

(10) Patent No.: US 8,700,033 B2
(45) Date of Patent: Apr. 15, 2014

(54) DYNAMIC ACCESS TO RADIO NETWORKS

(75) Inventor: Heather Maria Hinton, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 1094 days.

(21) Appl. No.: 12/196,348

(22) Filed: Aug. 22, 2008

(65) Prior Publication Data

US 2010/0048204 A1 Feb. 25, 2010

(51) Int. Cl.
*H04W 4/00* (2009.01)

(52) U.S. Cl.
USPC ......... 455/432.1; 455/436; 455/445; 455/466

(58) Field of Classification Search
CPC .............. H04W 36/0005; H04W 36/0016; H04W 36/0022; H04W 36/0066
USPC ........... 455/436–444, 406–408, 456.1–456.3; 726/8, 9, 2–7
See application file for complete search history.

(56) References Cited

U.S. PATENT DOCUMENTS

| | | | |
|---|---|---|---|
| 6,771,957 B2 | 8/2004 | Chitrapu | |
| 7,076,246 B2 | 7/2006 | Chitrapu | |
| 7,221,935 B2* | 5/2007 | Barriga-Caceres et al. | 455/414.1 |
| 7,418,485 B2* | 8/2008 | Payrits | 709/220 |
| 2002/0035723 A1* | 3/2002 | Inoue et al. | 725/1 |
| 2004/0137901 A1 | 7/2004 | Hamasaki et al. | |
| 2005/0096048 A1* | 5/2005 | Clare et al. | 455/433 |
| 2006/0009209 A1 | 1/2006 | Rieser et al. | |
| 2007/0127495 A1* | 6/2007 | de Gregorio et al. | 370/395.52 |
| 2008/0072301 A1 | 3/2008 | Chia et al. | |

FOREIGN PATENT DOCUMENTS

| | | |
|---|---|---|
| EP | 1739879 A1 | 1/2007 |
| WO | 2006129187 A | 12/2006 |
| WO | 2007022301 A2 | 2/2007 |
| WO | 2009006071 A2 | 8/2009 |

OTHER PUBLICATIONS

Neil Savage, Cognitive Radio, Technology Review, Mar./Apr. 2006, MIT. Information from: http://www.technologyreview.com/read_article.aspx?ch=specialsections&sc=emergingtech&id=16471 Sep. 17, 2008.

(Continued)

*Primary Examiner* — Kathy Wang-Hurst
(74) *Attorney, Agent, or Firm* — Garg Law Firm, PLLC; Rakesh Garg; Jeffrey S. LaBaw

(57) ABSTRACT

A method, system, and computer usable program product for dynamic access to radio networks are provided in the illustrative embodiments. A new radio network having a characteristic more suitable than a corresponding characteristic of a present radio network is detected. A request for access to the new radio network is sent, the request including a token, which includes structured information about a user, a device, a home network, or a billing service. Access to the new radio network is received. Switching is performed from the present radio network to the new radio network for wireless communication. The request for access to a radio network is received such that the requester is not known to a provider of the radio network. The requester is verified using a billing service provider or a home network provider identified in a token in the request. Upon verification, access is granted to the radio network.

18 Claims, 5 Drawing Sheets

(56) References Cited

OTHER PUBLICATIONS

Kelly Niknejad, Cognitive radio: a smarter way to use radio frequencies, Columbia News Service, Apr. 19, 2005, JSCMS. http://jscms.jm.columbia.edu/cns/2005-04-19/niknejad-smartradio Sep. 17, 2008.

Steven Ashley, Cognitive Radio, Scientific American Magazine, Feb. 2006 http://www.sciam.com/article.cfm?id=cognitive-radio&ref=sciam Sep. 17, 2008.

\* cited by examiner

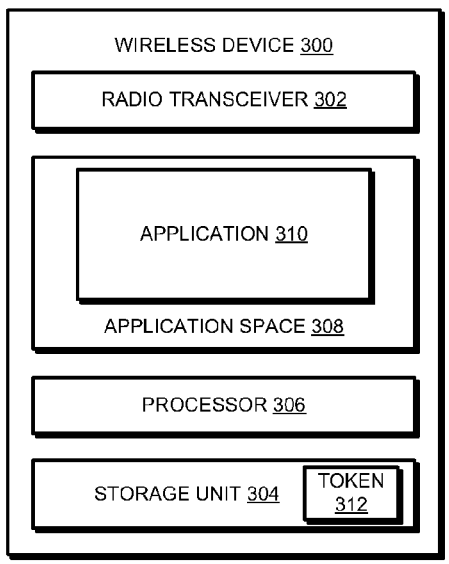
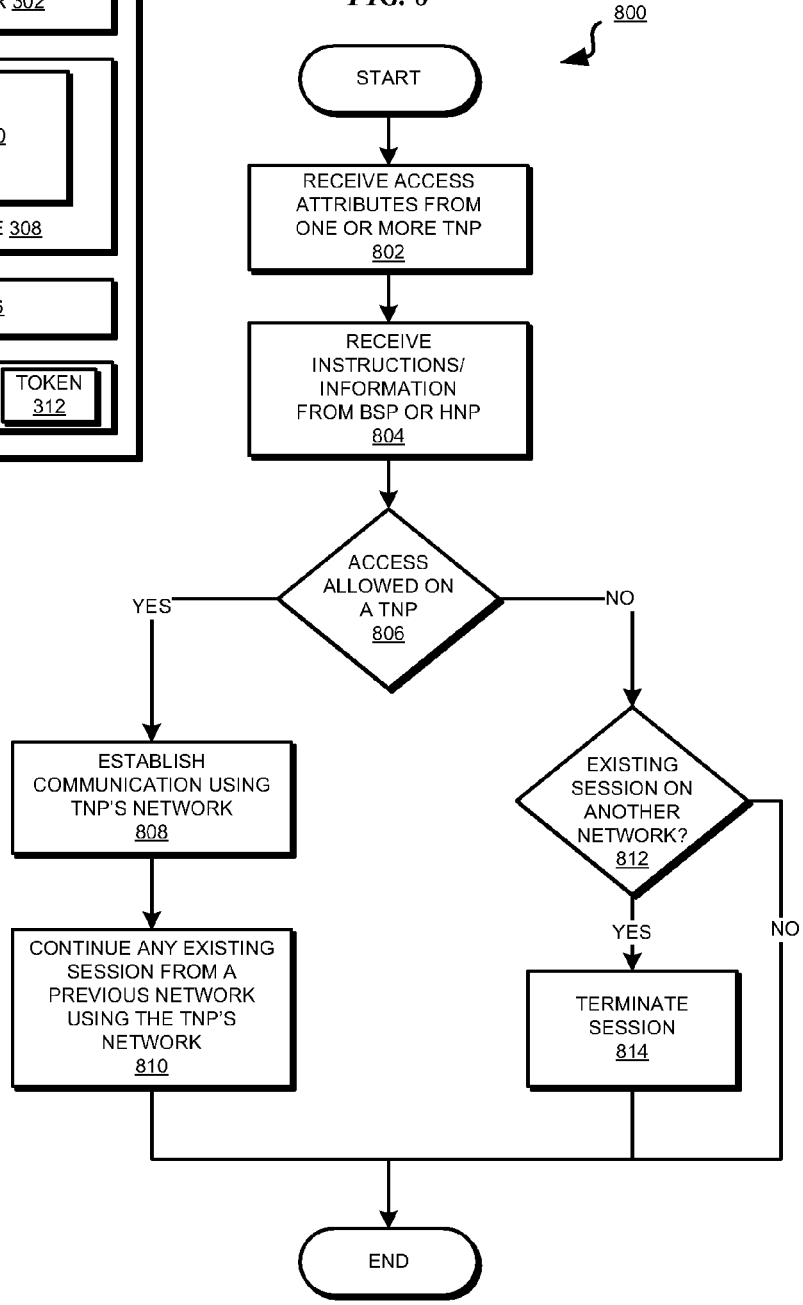

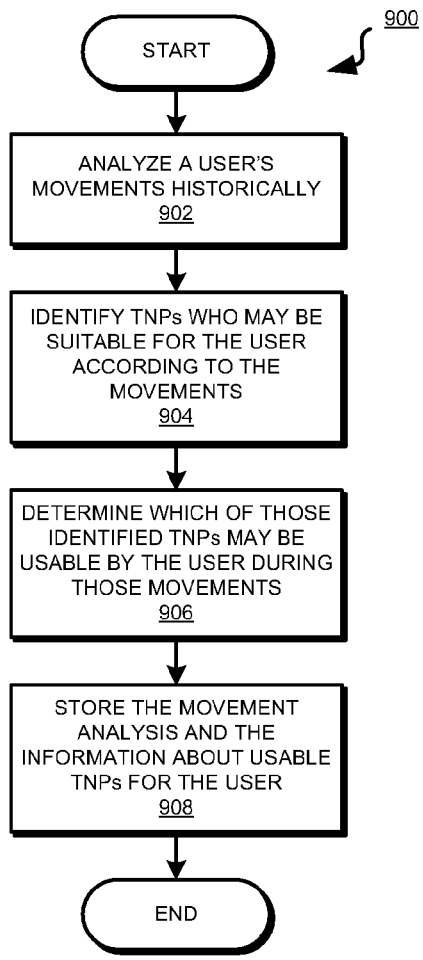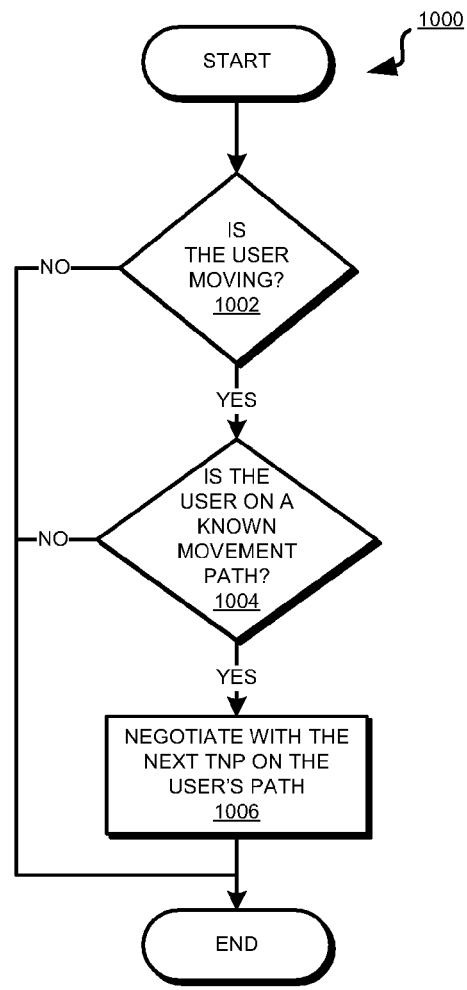

ly, the present invention relates to a computer implemented method, system, and computer usable program code for dynamic access to radio networks.

DYNAMIC ACCESS TO RADIO NETWORKS

BACKGROUND OF THE INVENTION

1. Field of the Invention

The present invention relates generally to an improved radio communication, and in particular, to a computer implemented method for using a radio communication network. Still more particularly, the present invention relates to a computer implemented method, system, and computer usable program code for dynamic access to radio networks.

2. Description of the Related Art

A wireless device uses radio frequencies and radio signals in those radio frequencies to establish and maintain a wireless communication. A variety of radio networks is available to a broad range of wireless devices for wireless communication. For example, a mobile phone, a computer with a wireless network adapter, a human interface such as a headset, may each utilize a variant of radio communication methods for establishing communication with their respective data processing systems, networks, or data processing environments.

Many presently-available devices are also capable of communicating over more than one type of radio networks. For example, a mobile phone can detect a particular wireless service provider's Global System for Mobile communication (GSM, originally, Groupe Spécial Mobile) wireless communication signal as well as a signal from a particular wireless data network. Such a mobile device can establish wireless communication using whichever of the two networks is available at a time and place.

A wireless device has to satisfy specific requirements of particular wireless communication network, or a radio network, to operate using that radio network. Likewise, a radio network has to have certain characteristics for a wireless device to use that radio network for wireless communication. Furthermore, the characteristics of the wireless device, the radio network, or both, are susceptible to change. For example, at a particular place or time, a particular provider's GSM network signal may be suitable for a data application to operate on a mobile phone. At another place or time, that same radio network may be unsuitable for the same application to operate on the same device.

SUMMARY OF THE INVENTION

The illustrative embodiments provide a method, system, and computer usable program product for dynamic access to radio networks. In one embodiment, a new radio network having a characteristic more suitable than a corresponding characteristic of a present radio network is detected. A request for access to the new radio network is sent, the request including a token, the token including structured information about one of a user, a device, a home network, and a billing service. Responsive to the request, access to the new radio network is received. Switching is performed from the present radio network to the new radio network for wireless communication.

The token may be stored in a storage unit associated with the device, a memory associated with the device, portable data storage, or data storage accessible to the device. The token may include identity attributes according to SAML, web services federation, OpenID, or Liberty-IDFF standards. The user may update the token using an identity management application.

In another embodiment, a request is received for access to a radio network, the request including a token, and the request originating from one of a user and a device, the user and the device not known to a provider of the radio network. The user or the device is identified from the token, forming a service identity. An attribute of the requested access is identified from the token. The service identity is verified using a billing service provider identified in the token or a home network provider identified in the token. A verification of the service identity is received. Access to the radio network is granted to the device.

Verifying the service identity may include identifying a protocol specified in the token, determining whether to use the protocol, and using the protocol for communicating with the billing service provider or the home network provider. Responsive to receiving the verification, an access attribute may be sent to the device, the access attribute specifying a characteristic of the access. A second token may also be sent to the device. The second token may include information about the radio network, the verification, a part of the service identity, or information usable for a future access to the radio network.

In another embodiment, historical information about a user's movements in a geographical area is analyzed, the analysis identifying a pattern in the user's movements. A set of transient network providers is identified in the pattern, the set of transient network providers including a first transient network provider whose network the user accesses while in the pattern or a second transient network provider whose network may be accessible to the user while in the pattern. A sequence of the transient network providers in the set of transient network providers is identified, the sequence corresponding to the order in which the user accesses the transient network providers. The pattern, the set of transient network providers, and the sequence are stored in relation with the user.

A determination may be made whether the user is presently following the pattern. A transient network provider in the set of transient network provider may be determined whose network the user is presently accessing. A next transient network provider may be selected in the sequence.

Access to the next transient network provider's network may be negotiated for the user's device such that the next transient network provider has already allowed access to the user's device before the user reaches the next transient network provider's network. Negotiating access may also operate such that the access may be allowed when the user reaches the next transient network provider's network.

A preferred transient network provider may be selected from the set of transient network providers that may be preferable over a comparable transient network provider that the user accesses. The comparable transient network provider may be replaced with the preferred transient network provider in the sequence.

BRIEF DESCRIPTION OF THE DRAWINGS

The novel features believed characteristic of the invention are set forth in the appended claims. The invention itself; however, as well as a preferred mode of use, further objectives and advantages thereof, will best be understood by reference to the following detailed description of an illustrative embodiment when read in conjunction with the accompanying drawings, wherein:

FIG. 3, this figure depicts a block diagram of a wireless device in which the illustrative embodiments may be implemented;

FIG. 8, this figure depicts a flowchart of a process of continuing a communication using dynamic access to radio networks in accordance with an illustrative embodiment;

FIG. 9, this figure depicts a flowchart of a process of identifying patterns in a user's dynamic access to radio networks in accordance with an illustrative embodiment; and FIG. 10, this figure depicts a flowchart of a process of negotiating dynamic access to a radio network in accordance with an illustrative embodiment.

DETAILED DESCRIPTION OF THE PREFERRED EMBODIMENT

Figure 1:
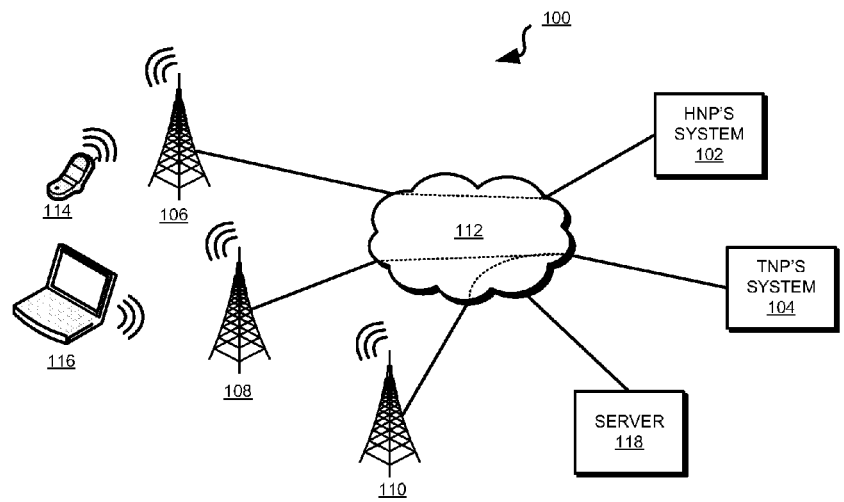
FIG. 1, this figure depicts a wireless communication environment in which an illustrative embodiment may be implemented.

Illustrative embodiments recognize that a user may encounter several alternative radio networks at a given place or time. For example, a mobile phone user may find that a set of radio networks from a set of wireless service providers is available along the user's route from home to work. A set of radio networks is one or more radio networks. A set of wireless service providers is one or more wireless service provider.

A wireless service provider may be a home network provider. A home network provider (HNP) is a provider of wireless communication services with whom a user has a service usage agreement or subscription. The subscription may determine which mobile device to use, and parameters of the wireless service usage. A home network is a radio network that the home network provider provides. A device subject to a subscription with a home network provider generally prefers the home network for wireless communications.

The illustrative embodiments recognize that mobile phone user in the above example, although subscribed to a home network provider's radio network, may find a radio network from a set of different network providers more suitable for a stretch of the route. Such different network providers are called transient network providers (TNPs). A set of transient network providers is one or more transient network providers. A transient network is a radio network that a transient network provider provides.

Furthermore, the set of transient network providers may include network providers providing a variety of radio networks. For example, a transient network provider may provide a GSM network, while another transient network provider may provide Bluetooth protocol based radio network. Yet another transient network provider may provide a satellite radio network for the wireless communication. Another transient network provider may provide a Wi-Fi network or any combination of the several types of radio networks.

Presently, a wireless device has limited options to communicate using radio networks other than the home network. "Roaming" in a network other than the home network is known in wireless communications using mobile phones. However, roaming involves a preexisting contractual arrangement between the home network provider and the transient network provider providing roaming services. The mobile phone registers with the transient network provider, which then facilitates wireless communication to the mobile phone over its radio network, subject to the preexisting arrangement, if any.

A limitation is such a technology is that if an agreement does not exist, the device is not allowed to communicate on the transient network. Furthermore, the roaming connectivity is determined, not by the device's request to the transient network but by the preexisting agreement between the home network provider and the transient network provider. The illustrative embodiments recognize that many other limitations of such a technology exist that limit the access of wireless devices to radio networks.

Another example of a preexisting but restrictive technology is a wireless device preconfigured to detect the signals of preselected and preconfigured radio networks. For example, a wireless network adapter can be configured to operate on a specific home network and a specific wireless data network, such as a local area network (LAN) at home or office.

A limitation of such a technology is that the transient networks are not actually transient in that they are preconfigured in the device. In this respect, the device operates on more than one home networks and not on transient networks that the device may not have been configured for beforehand.

The illustrative embodiments recognize that many other limitations of such preexisting technologies exist that restrict the dynamic access of wireless devices to radio networks. To address these and other problems related to accessing radio networks, the illustrative embodiments provide a method, system, and computer usable program product for dynamic access to radio networks. Dynamic access to a radio network includes determining, negotiating, establishing, and using connectivity to a radio network without requiring premade agreements or pre-configurations for connectivity to the radio network as described by the illustrative embodiments in this disclosure.

The illustrative embodiments provide ways to detect transient networks at a given place or time. The illustrative embodiments further provide ways to negotiate access to such one or more transient networks. The illustrative embodiments further provide ways for using the negotiated access to communicate over the radio network of the transient network provider.

The illustrative embodiments use structured information called a token or a bootstrap token, that a wireless device may provide to a transient network provider's system for negotiating access to the transient network provider's radio network. In some illustrative embodiments, the transient network provider may also provide tokens back to the wireless device to facilitate the communication over the transient network provider's radio network. Descriptions of FIGS. 3, 4, and 5 infra, provide details of the tokens and their operation.

Illustrative embodiments may be implemented as a combination of hardware and software. A unit resulting from such a combination may be portable or installable in a wireless unit. An implementation may implement the illustrative embodiments in conjunction with a hardware component, such as in a firmware, as embedded software in a hardware device, or in any other suitable hardware or software form.

Furthermore, a particular implementation may use the illustrative embodiments in conjunction with any application or any data processing system that can process wireless communication related information. Additionally, an implementation may use the illustrative embodiments in conjunction with a variety of communication protocols, such as mobile communications protocols GSM, CDMA, TDMA, or a variation thereof. An implementation may also use the illustrative embodiments in conjunction with a variety of wireless communication protocols such as Wi-Fi, WiMax, or Bluetooth for wireless data communications. An implementation may also use the illustrative embodiments in conjunction with satellite communication protocols such as Transport Protocol and Communication Resource Management for Mobile Satellite Networks (TRANSAT).

An implementation may use any suitable transmission method or frequency band for transmitting the condition information. For example, an implementation of an illustrative embodiment may transmit the condition information using ultra high frequency (UHF), very high frequency (VHF), frequency modulation (FM), amplitude modulation (AM), or shortwave radio bands.

Any advantages listed herein are only examples and are not limiting on the illustrative embodiments. A particular embodiment may have some, all, or none of the advantages listed above. Furthermore, specific embodiments may realize additional or different advantages. Such additional or different advantages are contemplated within the scope of the illustrative embodiments.

With reference to FIG. 1, this figure depicts a wireless communication environment in which an illustrative embodiment may be implemented. As an example, environment 100 includes two network providers depicted by home network provider's system 102 and transient network provider's system 104. Home network provider' system 102 may provide wireless services for the home network using radio transceiver 106. Transient network provider's system 104 may provide wireless services on a transient network using radio transceivers 108 and 110. A cellular base station and a wireless access point are some examples of radio transceivers 106, 108, and 110.

Home network provider's system 102 and transient network provider's system 104 may communicate with their respective radio transceivers over network 112. Network 112 may include one or more public or private data networks. An example of network 112 may be the Internet.

Wireless devices, such as mobile phone 114 and wireless network adapter equipped computer 116, may establish wireless communications using radio networks provided by radio transceivers 106, 108, or 110. For example, mobile phone 114 may establish a session with a web application on server 118 using the radio network provided by radio transceiver 106.

Mobile phone 114 and wireless network adapter equipped computer 116 are only examples of a wide variety of wireless devices that may be used in conjunction with the illustrative embodiments. Server 118 may be any data processing system that is accessible over a data network.

Furthermore, home network provider's system 102 and transient network provider's system 104 are shown only as examples. Any number of wireless service providers may provide radio networks in adjoining, overlapping, or disjoint geographical areas in a similar manner. Additionally, any home network provider's system, transient network provider's system, radio transceiver, and wireless device may include or have access to a data processing system for implementing the illustrative embodiments.

Figure 2:
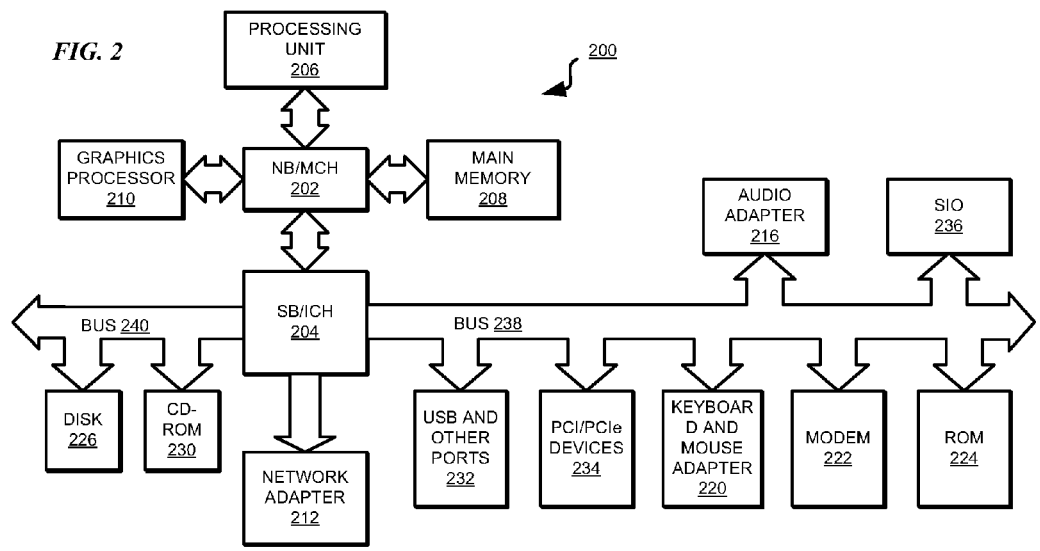
FIG. 2, this figure depicts a block diagram of a data processing system in which illustrative embodiments may be implemented.

With reference to FIG. 2, this figure depicts a block diagram of a data processing system in which illustrative embodiments may be implemented. Data processing system 200 is an example of a computer, such as a server, a client, or another data processing capability for processing inputs from various input devices as described with respect to FIG. 1.

Computer usable program code or instructions implementing the processes may be located in the computer for the illustrative embodiments.

In the depicted example, data processing system 200 employs a hub architecture including North Bridge and memory controller hub (NB/MCH) 202 and south bridge and input/output (I/O) controller hub (SB/ICH) 204. Processing unit 206, main memory 208, and graphics processor 210 are coupled to north bridge and memory controller hub (NB/MCH) 202. Processing unit 206 may contain one or more processors and may be implemented using one or more heterogeneous processor systems. Graphics processor 210 may be coupled to the NB/MCH through an accelerated graphics port (AGP) in certain implementations.

In the depicted example, local area network (LAN) adapter 212 is coupled to south bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to south bridge and I/O controller hub 204 through bus 238. Hard disk drive (HDD) 226 and CD-ROM 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE) or serial advanced technology attachment (SATA) interface. A super I/O (SIO) device 236 may be coupled to south bridge and I/O controller hub (SB/ICH) 204.

An operating system runs on processing unit 206. The operating system coordinates and provides control of various components within data processing system 200 in FIG. 2. The operating system may be a commercially available operating system such as Microsoft® Windows® XP (Microsoft and Windows are trademarks of Microsoft Corporation in the United States and other countries), or Linux® (Linux is a trademark of Linus Torvalds in the United States and other countries). An object oriented programming system, such as the Java™ programming system, may run in conjunction with the operating system and provides calls to the operating system from Java™ programs or applications executing on data processing system 200 (Java is a trademark of Sun Microsystems, Inc., in the United States and other countries).

Instructions for the operating system, the object-oriented programming system, and applications or programs are located on storage devices, such as hard disk drive 226, and may be loaded into main memory 208 for execution by processing unit 206. The processes of the illustrative embodiments may be performed by processing unit 206 using computer implemented instructions, which may be located in a memory, such as, for example, main memory 208, read only memory 224, or in one or more peripheral devices.

The hardware in FIG. 2 may vary depending on the implementation. Other internal hardware or peripheral devices, such as flash memory, equivalent non-volatile memory, or optical disk drives and the like, may be used in addition to or in place of the hardware depicted in FIG. 2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in north bridge and memory controller hub 202. A processing unit may include one or more processors or CPUs.

The depicted examples in FIG. 2 and above-described examples are not meant to imply architectural limitations. For example, data processing system 200 also may be a tablet computer, laptop computer, or telephone device in addition to taking the form of a PDA. Data processing system 200 may also be a unit that may be portable or installable in an automobile.

FIG. 2 also represents an example data processing environment in which illustrative embodiments may be implemented. FIG. 2 is only an example and is not intended to assert or imply any limitation with regard to the environments in which different embodiments may be implemented. A particular implementation may make many modifications to the depicted environments based on the following description.

With reference to FIG. 3, this figure depicts a block diagram of a wireless device in which the illustrative embodiments may be implemented. Wireless device 300 may be any of mobile phone 114 or wireless network adapter equipped computer 116 in FIG. 1 or any other device capable of communicating wirelessly.

Wireless device 300 may include radio transceiver 302 for communicating wirelessly over a radio network. Storage unit 304 may be a memory or a persistent storage for data in wireless device 300. For example, in a mobile phone, the Subscriber Identity Module (SIM) card or the mobile phone's memory may serve as a storage unit 304. In some instances, such as when wireless device 300 is a laptop computer, storage unit 304 may be the hard disk drive, the main memory. Storage unit 304 may also be a removable storage unit, such as a flash memory.

Processor 306 may compute or manipulate data including the data used in a wireless communication. Application space 308 may be a memory space in wireless device 300 that processor 306 may use to execute one or more application 310. Application 310 may be a software application or a component thereof.

In one embodiment, application 310 may be the application that detects, identifies, negotiates, establishes, and uses access to radio networks according to the illustrative embodiments. In so performing, application 310 may use a set of information that may be available to wireless device 300, such as token 312. A token is a set of information formed according to a predetermined structure for such information.

In one embodiment, token 312 may be stored in storage unit 304 as depicted. In another embodiment, token 312 may be a part of application 310 (not shown). In another embodiment, token 312 may be located elsewhere in wireless device 300. In another embodiment, token 312 may be separate from wireless device 300 but may be accessible to application 310, such as over a data network.

Token 312 may be based on a single sign-on standard such as security assertion markup language (SAML), Web services foundation, OpenID, Liberty ID-FF, or any other standard or proprietary representation. Token 312 based on any standard may include one or more identifying information for the user. Token 312 may also include one or more identifying information about a home network provider, a billing service provider (BSP), and other entities associated with the user. Furthermore, token 312 may includes one or more attributes of each such identifying information. A set of identifying information is one or more identifying information. A set of attributes is one or more attributes.

A billing service provider is an entity that provides billing information related to a user's use of certain services, including wireless communication services over radio networks. A billing service provider may be an entity that may be the same as or different from a user's home network provider. For example, a wireless carrier may be the home network provider for a user and may also be the billing service provider for the user. As another example, the user's home network provider may be a wireless carrier but the user's billing service provider may be an online identity management service provider.

As another example, a billing service provider may provide billing for service usage that a home network provider may not recognize, provide, or understand. For example, a home network provider may be the billing service provider for wireless communication services usage on a GSM network but may not understand how to bill for Bluetooth network usage. A separate billing service provider may assist with billing for such services.

Returning to token 312, token 312 may also specify one or more usage parameters related to a user, a wireless device, an application on the wireless device, or an application elsewhere to which the user has access. A set of parameters is one or more parameter. A usage parameter is a piece of information that describes a characteristic of a specific usage. For example, a usage parameter with respect to a wireless device may provide that the wireless device is capable of operating on a certain version of a certain wireless communication protocol.

Figure 4:
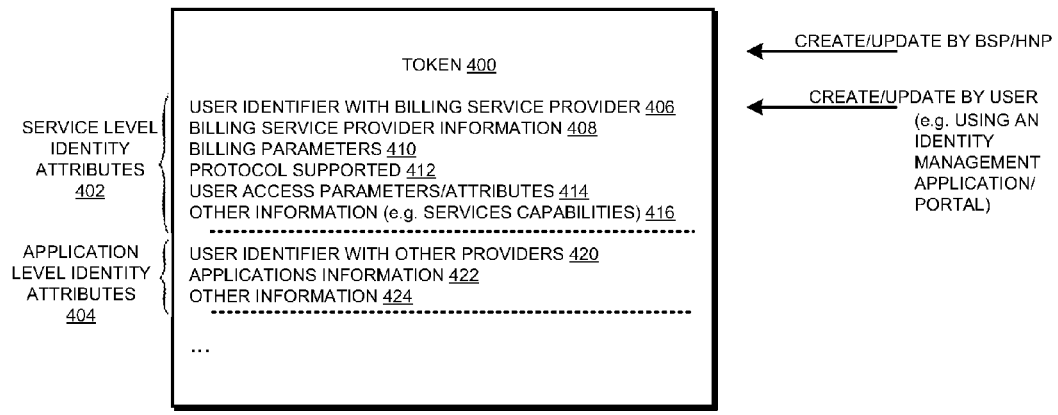
FIG. 4, this figure depicts a block diagram of a token in accordance with an illustrative embodiment.

With reference to FIG. 4, this figure depicts a block diagram of a token in accordance with an illustrative embodiment. Token 400 may be implemented as token 312 in FIG. 3.

As described above, a token may include a set of identities and a set of attributes related to each identity. An identity from the set of identities may describe how a user may utilize a wireless service. Such an identity is called a service level identity. Attributes of a service level identity are called service level identity attributes. Service level identity attributes 402 reflect an example service level identity and the corresponding attributes in token 400.

In one embodiment, token 400 may include a single service level identity and the corresponding attributes 402. In another embodiment, token 400 may include more than one service level identity and the corresponding attributes 402.

Another identity may describe how a user may use certain applications over that wireless service. Such an identity is called an application level identity. Attributes of an application level identity are called application level identity attributes. Application level identity attributes 404 reflect an example application level identity and the corresponding attributes in token 400. An embodiment of token 400 may include one or more application level identity and the corresponding attributes 404.

In one embodiment, service level identity attributes 402 may include an identity and corresponding attributes maintained by a home network provider. In another embodiment, service level identity attributes 402 may include an identity and corresponding attributes maintained by a billing service provider. As an example depicted in this figure, service level identity attributes 402 includes user identifier 406 that may be issued by a billing service provider. Service level identity attributes 402 may further include billing service provider information 408, such as a billing service provider identifier. Service level identity attributes 402 may further include billing parameters 410. Protocols 412 may be protocols or standards that are supported by token 400. For example, token 400 may be usable in a single sign-on session using a particular single sign-on standard. Furthermore, protocols 412 may provide a list of such protocols or standards indicating that that token 400 may be usable in more than one standards-based implementation.

Service level identity attributes 402 may further include one or more user access parameters or attributes 414, which may describe whether, how, and what type of services a wireless service provider may provide to the user. User access parameters 414 may include information about the capabilities of the wireless device, applications enabled using the wireless device, access levels and privileges of the user, and other similar information.

For example, in one embodiment, user access parameter 414 may provide that the user is a high priority user, such as law enforcement personnel. A high priority user may be provided preferential service over a radio network using user access parameter 414. As another example, an attribute in user access parameter 414 may provide that the user will communicate only on radio networks that are able to provide a certain bandwidth.

Application level identity attributes 404 may similarly include attributes with respect to applications that the user may use. User identifier 420 may be an identifier provided to the user by a different provider, such as an identity management service. Attributes for application information 422 may describe what applications, such as email, the user may access over the radio network. Application information 422 may be useful to a transient network provider in determining whether the user can be adequately supported on the transient network provider's network.

Other information 424 may be any application related information that may be useful in providing the user with application related service. For example, other information 424 may indicate a version of an application or platform that the user may be able to use.

Token 400 may be stored on the wireless device, remotely, or in a portable detachable form. Furthermore, the token may be created by the user, the billing service provider, the home network provider, or another entity. Additionally, a user may be able to manipulate the contents of the token, for example, by using an identity management application or portal over the Internet. In one embodiment, the contents may change automatically as a result of certain activities of the user, the billing service provider, the home network provider, or another entity.

Figure 5:
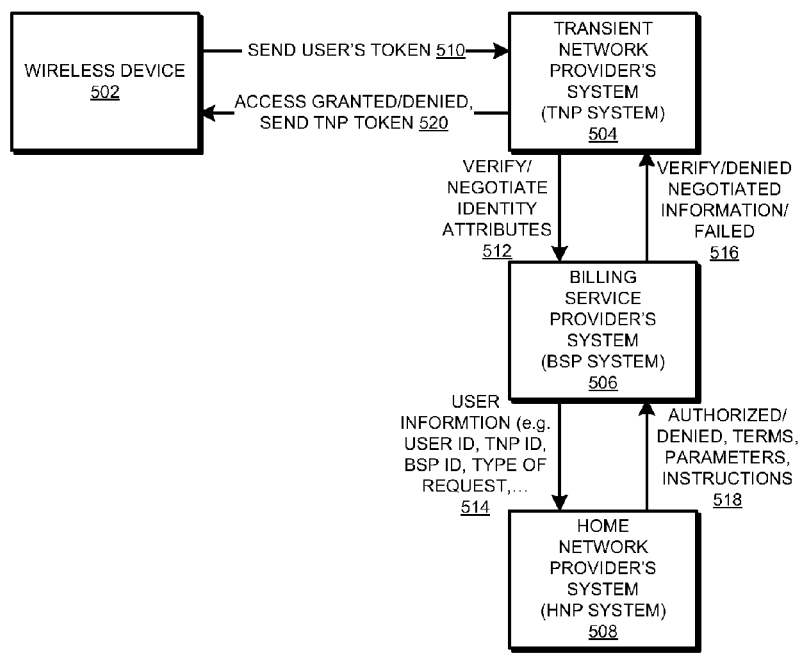
FIG. 5, this figure depicts a block diagram of dynamic access to radio networks using tokens according to an illustrative embodiment.

With reference to FIG. 5, this figure depicts a block diagram of dynamic access to radio networks using tokens according to an illustrative embodiment. Wireless device 502 may be implemented using mobile phone 114 or wireless network adapter equipped computer 116 in FIG. 1. Transient network provider's system 504 may be implemented using transient network provider's system 104 in FIG. 1. Billing service provider's system 506 may be a data processing system that a billing service provider as described with respect to FIG. 4 may use. Home network provider's system 508 may be implemented using home network provider's system 102 in FIG. 1.

This figure depicts an example scenario where a wireless device may identify a radio network of a transient network provider, and attempt to establish access to the transient network provider's radio network. Wireless device 502 may send a request for access 510 including a token to transient network provider's system 504. The token may be a token similar to token 400 in FIG. 4 and may be associated with the user of wireless device 502.

Transient network provider's system 504 receives request 510 including the token and parses the token. Transient network provider's system 504 submits verification or negotiating inquiry 512 to the billing service provider identified in the token. Verification or negotiating inquiry 512 may include attributes extracted from the token, or the token itself as received from wireless device 502.

Furthermore, transient network provider's system 504 may make inquiry 512 using a protocol identified in the token. For example, a token according to token 400 in FIG. 4 may include a list of protocols 412 that are supported by the token 400 in FIG. 4. Transient network provider's system 504 may identify one or more protocols that the transient network provider may support for back-channel communication with billing service providers and home network providers. Transient network provider's system 504 may select one such protocol from the token to make inquiry 512.

Billing service provider's system 506 may receive inquiry 512. Billing service provider's system 506 may process inquiry 512 and send request 514 to home network provider's system 508, or respond to transient network provider's system 504 with response 516. Billing service provider's system 506 may identify the home network provider by parsing the token if passed in inquiry 512, or if an attribute of the identity of the home network provider is passed in inquiry 512. If billing service provider's system 506 responds with response 516, response 516 may include a confirmation or rejection of the user, the device, the request, or a combination thereof. Response 516 may also include any terms for providing the access and service to the user or wireless device 502 on the transient network provider's radio network. Note that in this manner, the billing service provider and the transient network provider need not have pre-agreed to any roaming-type arrangements. Further note that wireless device 502 need not have been preconfigured to operate on the transient network provider's network.

As an example, billing service provider's system 506 may alternatively send request 514 to home network provider's system 508. Request 514 may include attributes identifying the user of wireless device 502, the transient network provider of transient network provider's system 504, the billing service provider of billing service provider's system 506, type of access wireless device 502 is requesting the transient network provider, and any other information useful to home network provider's system 508.

Home network provider's system 508 may respond with response 518 to billing service provider's system 506. Response 518 may include authorization or denial for access to transient network provider's network, and any terms, parameters, or instructions for such access. Home network provider's system 508 may identify some terms, parameters, or instructions as being directed to wireless device 502, billing service provider's system 506, transient network provider's system 504 or a combination thereof.

In this alternative operation, billing service provider's system 506 may send response 516 based on response 518 received from home network provider's system 508. Transient network provider's system, upon receiving response 516 may determine whether to grant the access that wireless device 502 requested. In making this determination, transient network provider's system may include the terms, parameters, authorizations, and instructions that billing service provider's system 506 or home network provider's system 508 may have provided in responses 516 or 518.

Based on this determination, transient network provider's system may send response 520 to wireless device 502 authorizing or denying access. Response 520 may also include any additional information or instructions from either the transient network provider, the billing service provider, or the home network provider.

In one embodiment, transient network provider's system may also provide a transient network provider's token in response 520. Transient network provider's token may be tokenized information that may facilitate the transient network provider in providing wireless services to wireless device 502 and applications thereon. For example, transient network provider's token may save some transient network provider related information on wireless device 502 for use in the currently requested session or future sessions over transient network provider's radio network.

As an example, transient network provider's token may include attributes that identify the transient network provider, the current access determination, and any terms or instructions associated with currently granted or denied access. Using this example information, the transient network provider may be able to grant or deny a future access request from wireless device 502 without having to make back-channel inquiry 512.

As another example, transient network provider's token may include code to track the performance and usage of the transient network provider's services with respect to wireless device 502. The transient network provider may use the resulting data from such code to bill for, tune, or improve on the services that the transient network provider provides.

The architecture described in FIG. 5 is only one possible configuration and is used as an example for the clarity of the description. In alternative embodiments, the billing service provider may be part of the transient network provider or the home network provider, may be an independent third party, or some combination thereof. The transient network provider may communicate directly with the home network provider and/or the billing service provider to negotiate the authorization with the home network provider and to provide the billing information to the billing service provider. The billing service provider and the home network provider may then communicate with each other to pull or push the billing information.

In one embodiment, the transient network provider and the home network provider may have their own billing service providers that can communicate in this manner with each other. While the billing service provider can operate to broker the relationship between the transient network provider and the home network provider when none exists, this embodiment may provide comparable functionality when these relationships do exist.

Figure 6:
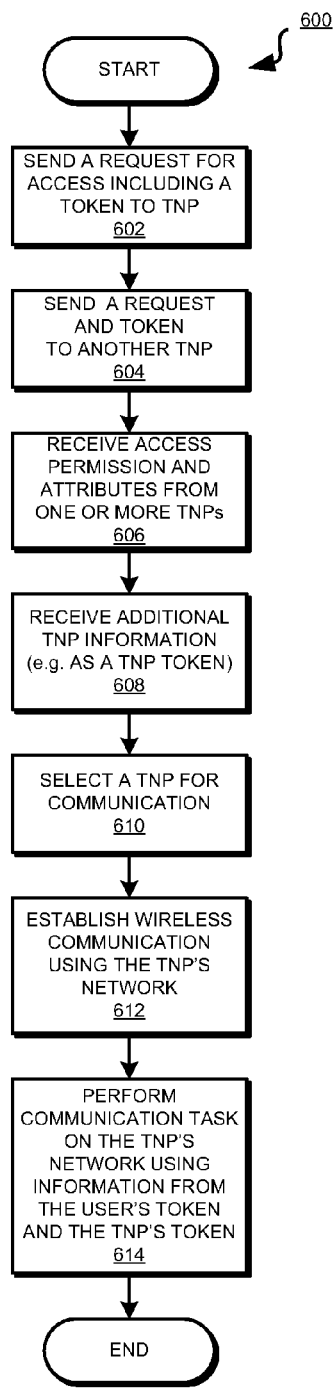
FIG. 6, this figure depicts a flowchart of a process of dynamically accessing a radio network in accordance with an illustrative embodiment.

With reference to FIG. 6, this figure depicts a flowchart of a process of dynamically accessing a radio network in accordance with an illustrative embodiment. Process 600 may be implemented in a wireless device, such as wireless device 502 in FIG. 5.

Process 600 begins by sending a request for access including a user's token to a transient network provider (step 602). Process 600 may detect more than one transient networks at a given time or place of execution. In one embodiment, process 600 may select one transient network to send the request and token of step 602. In another embodiment, process 600 may also send a similar access request and the user's token to more than one transient networks (step 604).

In response to step 602, and to step 604 if used, process 600 receives access permission and access attributes from one or more transient network providers (step 606). Process 600 may also receive additional information from the transient network provider, such as a transient network provider token, or terms or instructions for access (step 608).

If process 600 receives responses from more than one transient network provider, process 600 selects a transient network provider for establishing wireless communication (step 610). Process 600 establishes communications using the selected transient network provider's radio network (step 612). Process 600 performs communications tasks on the transient network provider's network using information from the user's token and transient network provider's token, if any (step 614). Process 600 ends thereafter.

Figure 7:
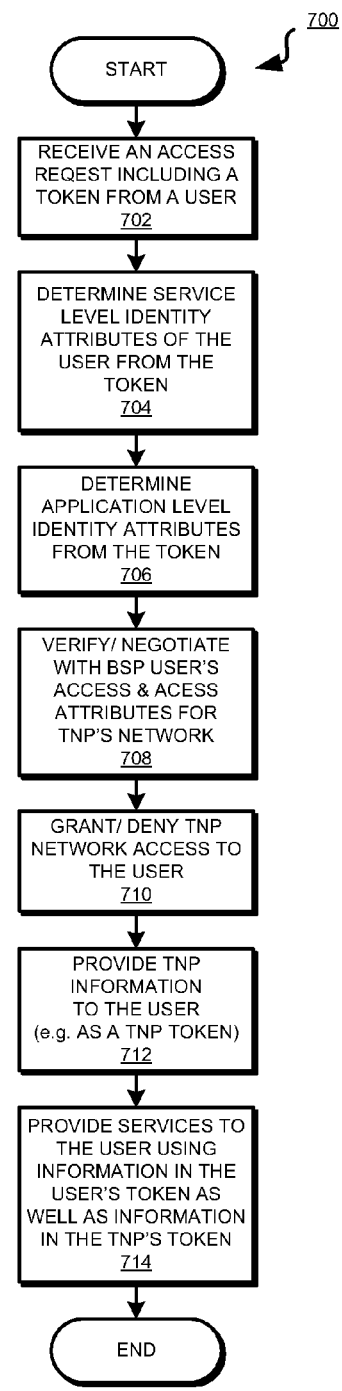
FIG. 7, this figure depicts a flowchart of a process of allowing dynamic access to a radio network in accordance with an illustrative embodiment.

With reference to FIG. 7, this figure depicts a flowchart of a process of allowing dynamic access to a radio network in accordance with an illustrative embodiment. Process 700 may be implemented in a transient network provider's system such as transient network provider's system 504 in FIG. 5.

Process 700 begins by receiving an access request including a token from a user or a wireless device associated with a user (step 702). Process 700 may determine the service level identity attributes from the token (step 704). As an example, the service level identity attributes may indicate to process 700 the nature of service the user or the wireless device may be requesting.

Process 700 determines any application level identity attributes associated with the token (step 706). As an example, process 700 may use the application level identity attributes for determining whether certain applications can be supported, or for verifying access or service to those applications.

Process 700 verifies the identity contained in the token of the access request, and negotiates the access attributes for the access (step 708). Process 700 may perform step 708 by communicating with a process in a billing service provider's system by using a protocol identified in the token, or with a known home network provider in cases where a relationship with the home network provider may already exist.

Process 700 grants or denies the requested access (step 710). Process 700 may perform step 710 and grant or deny access based on the information received and attributes negotiated with the billing service provider's process in step 708.

Process 700 may also provide transient network provider related information, for example, in the form of a transient network provider token (step 712). An embodiment may provide the transient network provider information in forms other than a token within the scope of the illustrative embodiments.

Process 700 provides the wireless communication services over the transient network provider's radio network using the information in the user's token as well as information in the transient network provider token, if any (step 714). Process 700 ends thereafter. In one embodiment, process 700 may perform step 714 only if process 700 grants the requested access. In another embodiment, process 700 may provide some limited services, such as emergency services, even if process 700 does not grant the requested access.

With reference to FIG. 8, this figure depicts a flowchart of a process of continuing a communication using dynamic access to radio networks in accordance with an illustrative embodiment. Process 800 may be implemented in a wireless device, such as wireless device 502 in FIG. 5. Further, process 800 may be implemented in conjunction with process 600, such as following step 608 or 610 in FIG. 6.

Process 800 begins by receiving access attributes from one or more transient network providers (step 802). Step 802 may replace or augment step 608 in FIG. 6. Process 800 may also receive instructions or additional information about accessing particular transient network provider's network from a process in the billing service provider, a process in the home network provider, or both (step 804). For example, the home network provider may instruct process 800 to use only voice services on the transient network provider and not the data services. As another example, the process in billing service provider may inform process 800 to store certain information about a particular transient network provider so that future access to that transient network provider may be granted without verifying from the billing service provider.

In one embodiment, a user may be able to set one or more preferences for selecting one or more transient network providers under certain circumstances. An implementation of process 800 may also consider such preferences in step 804.

Process 800 determines if the access attributes and other information received in steps 802 and 804 indicate that access to a transient network provider has been granted (step 806). If access is allowed to at least one transient network provider's radio network ("Yes" path of step 806), process 800 establishes communication using that transient network provider's radio network (step 808).

While process 800 is negotiating access to a transient network provider's network, the wireless device in which process 800 may be implemented may already be in a wireless communication session using a previous provider's radio network. In many applications, maintaining the continuity of a session may be desirable. If such an application is in a session using the previous provider's network, process 800 switches the radio network from the previous provider's network to the new transient network provider's network without disturbing the application's session (step 810). Process 800 ends thereafter.

If no access is available to any transient network provider's radio network ("No" path of step 806), process 800 determines if any sessions are in progress using a previous provider's network as described above (step 812). If a session is in progress, ("Yes" path of step 812), process 800 terminates such session at a desirable point and in a desirable manner (step 814). Process 800 ends thereafter. If no such session is existing on a previous provider's network ("No" path of step 812), process 800 terminates.

A wireless service provider, such as a home network provider, may be able to identify a pattern in a user's transient network usage. For example, a user may commute each work day to work and may switch to the same transient network providers in the same order each day.

A user's usage may have several patterns formed in this manner. For example, the user, on his way back from work may switch to a different set of transient networks, may be because better bandwidth is available from different networks at different times of the day. In this manner, many patterns may be identified in a user's usage.

A service provider may be able to provide value added services to the user based on the detection of these patterns. For example, a service provider may be able to record the patterns, the sequence of transient networks a user uses, and negotiate access to those radio networks ahead of the user entering the service area of those networks. The user may experience better service quality, fewer dropped or unavailable connections, and other wireless communication issues.

With reference to FIG. 9, this figure depicts a flowchart of a process of identifying patterns in a user's dynamic access to radio networks in accordance with an illustrative embodiment. Process 900 may be implemented in billing service provider's system 506 in FIG. 5 or home network provider's system 508 in FIG. 5.

Process 900 begins by performing a historical analysis of a user's movements through various home and transient networks (step 902). Process 900 identifies the transient network providers who may be suitable for use by the user according to the user's movements (step 904).

Some of the identified transient network providers may have comparable or better suited transient network providers competing in the same geographical areas. Process 900 determines which of those transient network providers may be usable by the user during future movements of similar movement patterns (step 906). Process 900 stores in relation to the user the movement analysis and the information about usable transient network providers from step 906 (step 908). Process 900 ends thereafter.

With reference to FIG. 10, this figure depicts a flowchart of a process of negotiating dynamic access to a radio network in accordance with an illustrative embodiment. Process 1000 may be implemented in wireless device 502, or home network provider's system 508, or billing service provider's system 506 in FIG. 5.

Process 1000 begins by determining if a user for whom a pattern of movement is stored and transient network providers identified is moving (step 1002). If the user is not moving ("No" path of step 1002), process 1000 terminates.

If the user is moving ("Yes" path of step 1002), process 1000 determines if the user is in a known movement path identified as one of the patterns (step 1004). If the user is not on a known movement path ("No" path of step 1004), process 1000 terminates.

If the user is on a known movement path ("Yes" path of step 1004), process 1000 negotiates access to the next transient network provider in the user's movement path to whose network the user is likely to require access (step 1006). Process 1000 ends thereafter.

In one embodiment, process 1000 may be adapted by using additional or modified steps to determine whether the user is deviating from a known movement path. Process 1000 may additionally determine, such as upon making the determination of deviation, where the next likely transient network provider is located. In such an embodiment, process 1000 may pre-negotiate access to such likely one or more transient networks.

Such an embodiment may be particularly useful in providing high quality services and connectivity to high value clients or clients with high availability requirement. Such an embodiment is contemplated within the scope of the illustrative embodiments.

When process 1000 is implemented in a wireless device, process 1000 initiates the negotiation in performance of step 1006 as described with respect to FIGS. 5 and 6. When implemented in a billing service provider's system or a home network provider's system, process 1000 may initiate negotiation in performance of step 1006 by sending a request for access and the user's token to the transient network provider from those systems.

The components in the block diagrams and the steps in the flowcharts and timing diagrams described above are described only as examples. The components and the steps have been selected for the clarity of the description and are not limiting on the illustrative embodiments. For example, a particular implementation may combine, omit, further subdivide, modify, augment, reduce, or implement alternatively, any of the components or steps without departing from the scope of the illustrative embodiments. Furthermore, the steps of the processes described above may be performed in a different order within the scope of the illustrative embodiments.

Thus, a computer implemented method, apparatus, and computer program product are provided in the illustrative embodiments for dynamic access to radio networks. The illustrative embodiments determine when access to a radio network may be needed and send request for access to those one or more transient networks. If more than one networks is available, the illustrative embodiments select a transient network to use or request access to several transient networks.

When more than one transient networks allow access, the illustrative embodiments determine which transient network to use based on one or more criterion. For example, the illustrative embodiments may select one of those transient network providers based on which of the transient network provider that was first to grant access, the transient network provider that has the most bandwidth available, the transient network provider that offers access to a comparatively larger number of applications, and any other similarly usable criterion.

The illustrative embodiments use tokens for providing the information for dynamic negotiation of network access. The token may be standards based, may be portable from one device to another, and may be customizable by the user, the billing service provider, the home network provider, or a combination thereof.

A transient network provider that provides access to a device implementing the illustrative embodiments may also provide the transient network provider's information in a tokenized form. The transient network provider and the device of the illustrative embodiments may use the user's token as well as the transient network provider's token for negotiating, establishing, using, and improving a present or future access to the transient network provider's network.

The invention can take the form of an entirely hardware embodiment, an entirely software embodiment, or an embodiment containing both hardware and software elements. In a preferred embodiment, the invention is implemented in software, which includes but is not limited to firmware, resident software, and microcode.

Furthermore, the invention can take the form of a computer program product accessible from a computer-usable or computer-readable medium providing program code for use by or in connection with a computer or any instruction execution system. For the purposes of this description, a computer-usable or computer-readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W) and DVD.

Further, a computer storage medium may contain or store a computer-readable program code such that when the computer-readable program code is executed on a computer, the execution of this computer-readable program code causes the computer to transmit another computer-readable program code over a communications link. This communications link may use a medium that is, for example without limitation, physical or wireless.

A data processing system suitable for storing and/or executing program code will include at least one processor coupled directly or indirectly to memory elements through a system bus. The memory elements can include local memory employed during actual execution of the program code, bulk storage, and cache memories, which provide temporary storage of at least some program code in order to reduce the number of times code must be retrieved from bulk storage during execution.

A data processing system may act as a server data processing system or a client data processing system. Server and client data processing systems may include data storage media that are computer usable, such as being computer readable. A data storage medium associated with a server data processing system may contain computer usable code. A client data processing system may download that computer usable code, such as for storing on a data storage medium associated with the client data processing system, or for using in the client data processing system. The server data processing system may similarly upload computer usable code from the client data processing system. The computer usable code resulting from a computer usable program product embodiment of the illustrative embodiments may be uploaded or downloaded using server and client data processing systems in this manner.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to explain the principles of the invention, the practical application, and to enable others of ordinary skill in the art to understand the invention for various embodiments with various modifications as are suited to the particular use contemplated.

What is claimed is:

1. A computer implemented method for dynamic access to a radio network, the computer implemented method comprising:
   detecting a new radio network having a characteristic more suitable than a corresponding characteristic of a present radio network;
   sending a request for access to the new radio network, the request including a token, the token including structured information about a home network and a protocol for back-channel communication between a provider of the new radio network and a provider of the home network, wherein the provider of the new radio network provider uses the protocol to send an inquiry to the provider of the home network;
   receiving, responsive to the request, access to the new radio network; and
   switching from the present radio network to the new radio network for wireless communication.

2. The computer implemented method of claim 1, wherein the token further includes a second protocol for back-channel communication between the provider of the new radio network and a billing service provider.

3. The computer implemented method of claim 1, wherein the token includes identity attributes according to SAML standard.

4. The computer implemented method of claim 1, further comprising:
   updating, by the user, the token using an identity management application.

5. A computer implemented method for dynamic access to a radio network, the computer implemented method comprising:
   receiving a request for access to a radio network, the request including a token, and the request originating from a device, the device and a user of the device not known to a provider of the radio network;
   identifying one of the user and the device from the token, forming a service identity;
   identifying an attribute of the requested access from the token, the attribute specifying a protocol for back-channel communication between a provider of the radio network and a provider of a home network of the device, wherein the provider of the radio network provider uses the protocol to send an inquiry to the provider of the home network;
   verifying the service identity using one of a billing service provider identified in the token and a home network provider identified in the token;
   receiving a verification of the service identity; and
   granting access to the radio network to the device.

6. The computer implemented method of claim 5, wherein verifying the service identity includes:
   determining whether to use the protocol; and
   using the protocol for communicating with the home network provider.

7. The computer implemented method of claim 5, wherein the radio network is a transient network different from the home network, further comprising:
   sending, responsive to receiving the verification, an access attribute to the device, the access attribute specifying a characteristic of the access; and
   sending, from the transient network, a second token to the device.

8. The computer implemented method of claim 7, wherein the second token includes information usable for a future access to the radio network.

9. A computer usable program product comprising a computer usable storage device including computer usable code for dynamic access to a radio network, the computer usable code comprising:
   computer usable code for detecting a new radio network having a characteristic more suitable than a corresponding characteristic of a present radio network;
   computer usable code for sending a request for access to the new radio network, the request including a token, the token including structured information about a home network and a protocol for back-channel communication between a provider of the new radio network and a provider of the home network, wherein the provider of the new radio network provider uses the protocol to send an inquiry to the provider of the home network;
   computer usable code for receiving, responsive to the request, access to the new radio network; and
   computer usable code for switching from the present radio network to the new radio network for wireless communication.

10. The computer usable program product of claim 9, wherein the token further includes a second protocol for back-channel communication between the provider of the new radio network and a billing service provider.

11. The computer usable program product of claim 9, wherein the token includes identity attributes according to SAML standard.

12. The computer usable program product of claim 9, further comprising:
   computer usable code for updating, by the user, the token using an identity management application.

13. The computer program product of claim 9, wherein the computer usable code is stored in a computer readable storage medium in a data processing system, and wherein the computer usable code is transferred over a network from a remote data processing system.

14. The computer program product of claim 9, wherein the computer usable code is stored in a computer readable storage medium in a server data processing system, and wherein the computer usable code is downloaded over a network to a remote data processing system for use in a computer readable storage medium associated with the remote data processing system.

15. A data processing system for dynamic access to a radio network, the data processing system comprising:
   a storage device including a storage medium, wherein the storage device stores computer usable program code; and
   a processor, wherein the processor executes the computer usable program code, and wherein the computer usable program code comprises:
   computer usable code for receiving a request for access to a radio network, the request including a token, and the request originating from a device, the device and a user of the device not known to a provider of the radio network;
   computer usable code for identifying one of the user and the device from the token, forming a service identity;
   computer usable code for identifying an attribute of the requested access from the token, the attribute specifying a protocol for back-channel communication between a provider of the radio network and a provider of a home network of the device, wherein the provider of the radio network provider uses the protocol to send an inquiry to the provider of the home network;
   computer usable code for verifying the service identity using one of a billing service provider identified in the token and a home network provider identified in the token;
   computer usable code for receiving a verification of the service identity; and
   computer usable code for granting access to the radio network to the device.

16. The data processing system of claim 15, wherein verifying the service identity includes:
   computer usable code for determining whether to use the protocol; and
   computer usable code for using the protocol for communicating with the home network provider.

17. The data processing system of claim 15, wherein the radio network is a transient network different from the home network, further comprising:
   computer usable code for sending, responsive to receiving the verification, an access attribute to the device, the access attribute specifying a characteristic of the access; and
   computer usable code for sending, from the transient network, a second token to the device.

18. The data processing system of claim 17, wherein the second token includes information usable for a future access to the radio network.

* * * * *